United States Patent
Natchoo et al.

(10) Patent No.: US 11,815,233 B2
(45) Date of Patent: Nov. 14, 2023

(54) OPTICAL DEVICE AND MODULE COMPRISING SUCH AN OPTICAL DEVICE, BOTH INTENDED FOR A LIGHTING DEVICE, ENABLING THE CREATION OF LIGHTING EFFECTS

(71) Applicant: ARTEFFECT, Montreuil (FR)

(72) Inventors: Philippe Natchoo, Roissy-en-Brie (FR); Sylvain Strazielle, Montreuil (FR); Charles Comperat, Paris (FR); Simon Blatrix, Paris (FR)

(73) Assignee: ARTEFFECT, Montreuil (FR)

( * ) Notice: Subject to any disclaimer, the term of this patent is extended or adjusted under 35 U.S.C. 154(b) by 0 days.

(21) Appl. No.: 17/642,557

(22) PCT Filed: Sep. 25, 2020

(86) PCT No.: PCT/EP2020/076998
§ 371 (c)(1),
(2) Date: Mar. 11, 2022

(87) PCT Pub. No.: WO2021/058797
PCT Pub. Date: Apr. 1, 2021

(65) Prior Publication Data
US 2022/0333752 A1    Oct. 20, 2022

(30) Foreign Application Priority Data
Sep. 26, 2019   (FR) ..................................... 1910667

(51) Int. Cl.
*F21V 7/00*    (2006.01)
*F21V 7/22*    (2018.01)
(Continued)

(52) U.S. Cl.
CPC ............ *F21S 10/06* (2013.01); *F21V 7/0025* (2013.01); *F21V 7/22* (2013.01); *F21V 14/04* (2013.01);
(Continued)

(58) Field of Classification Search
CPC .......... F21V 7/0025; F21V 7/22; F21V 14/04; F21V 7/05; F21Y 2115/30; F21W 2131/406; F21S 10/06; F21S 10/063
See application file for complete search history.

(56) References Cited

U.S. PATENT DOCUMENTS 4,945,459 A  *  7/1990  Ferren .................. F21S 10/06
                                              362/284
7,202,985 B2 *  4/2007  Miyagawa ........... G02B 27/283
                                              359/204.3
(Continued)

OTHER PUBLICATIONS

French Search Report received for Application No. 1910667, dated Sep. 9, 2020.
(Continued)

*Primary Examiner* — Eric T Eide
(74) *Attorney, Agent, or Firm* — Greer, Burns & Crain, Ltd (57) ABSTRACT

An optical device including a support mounted on a rotational-drive motor, and a reflective optical component, the support including at least one sleeve coaxial with the rotational-drive axis, of which sleeve one end defines an inlet orifice and which sleeve in its wall includes an opening defining an outlet orifice, and inside which sleeve the reflective optical component is housed in such a way that a beam of light entering via the inlet orifice is reflected by the reflective optical component to exit via the outlet orifice. An optical component mounted and retained in the sleeve as a result of cooperation of shape between it and the wall of said sleeve is also discussed.

27 Claims, 5 Drawing Sheets

(51) Int. Cl.
*F21V 14/04* (2006.01)
*F21Y 115/30* (2016.01)
*F21W 131/406* (2006.01)
*F21S 10/06* (2006.01)
*G02B 7/182* (2021.01)

(52) U.S. Cl.
CPC ..... *G02B 7/1821* (2013.01); *F21W 2131/406* (2013.01); *F21Y 2115/30* (2016.08)

(56) References Cited

U.S. PATENT DOCUMENTS

| | | | |
|---|---|---|---|
| 2006/0268549 A1 | 11/2006 | Oehlke | |
| 2015/0145994 A1* | 5/2015 | Quadri | H04N 7/18 362/277 |
| 2016/0123549 A1 | 5/2016 | Linz et al. | |
| 2016/0305644 A1* | 10/2016 | Quadri | F21V 14/04 |
| 2016/0377264 A1* | 12/2016 | Levin | F21L 4/00 362/35 |
| 2019/0014912 A1* | 1/2019 | Nishida | G03B 21/62 |

OTHER PUBLICATIONS

International Search Report and Written Opinion received for PCT/EP2020/076998, dated Jan. 22, 2021.

* cited by examiner

OPTICAL DEVICE AND MODULE COMPRISING SUCH AN OPTICAL DEVICE, BOTH INTENDED FOR A LIGHTING DEVICE, ENABLING THE CREATION OF LIGHTING EFFECTS

BACKGROUND

The present invention relates to an optical device intended for a lighting device, enabling the creation of lighting effects. The field of the invention is more particularly that of scenic lighting, in particular in the field of architecture and that of entertainment, for example in discos, concert auditoria, parades, theatre productions, live shows, dance, for public and private events, television broadcasts, etc.

A lighting device of this type was described in document FR-A-3 006 454 and comprises: at least one source arranged to emit a light beam, an optical device arranged to send each light beam from a central zone in several possible directions contained within a cone of light the apex of which is situated in the central zone, so that each light beam propagates in its cone of light, preferably an enclosed space (containing elements in suspension arranged to diffuse the light from each light beam, and a reflective system arranged to receive each light beam propagating in its cone or plane of light and to reflect in a space (preferably in the above optional enclosed space) each light beam received, said reflective system preferably being arranged to move between several positions so that a change of position modifies the path of a light beam reflected by the reflective system. Such a lighting device allows a light beam to be converted into a light surface.

Each source preferably comprises a laser or an electroluminescent diode, or any other suitable light source. With respect to the optical device, it comprises a reflective surface mounted rotatably in the central zone of the lighting device about an axis.

This reflective surface is preferably arranged to reflect each light beam so that after reflection by the reflective surface, each light beam is propagated in its cone of light or in a plane in a direction that preferably depends on an angular position of the reflective surface about its axis.

The optical device thus comprises a reflective surface as well as a support for this reflective surface and control means arranged to control a rotation of the reflective surface about its axis.

Beyond a speed of rotation w of the optical device about its axis, retinal persistence will give the spectator the impression of viewing a light surface the shape of which will vary as a function of the instants at which each of the sources emits its beam; the shape of the light surface, initially contained in the cone of light of this beam, is modified by reflection on the reflective system which outputs this beam, and thus this "light surface", beyond the cone of light of this beam. In this case the optical system converts each light beam into a first "light surface" part along its cone of light inside the enclosed space, then this light surface is deployed inside the enclosed space in a second part beyond the cone of light of this beam, after having been reflected by the reflective system.

An optical device utilized in a lighting device according to this state of the art comprises a reflective surface mounted on a support that is mounted capable of being driven in rotation on a motor. Such a support comprises in particular a disk having on one of its faces a circular wall arranged projecting and defining a sleeve the central longitudinal axis of which is merged with the central axis of the disk, coaxial with the axis of rotational drive of the support by the motor.

Mounted bonded in the sleeve is the reflective surface, which is constituted by a mirror, and which has an inclination of approximately 45°, for example, with respect to the disk, the light beam reflected by the surface passing through an opening or aperture arranged in the circular wall of the sleeve.

Manufacturing such a device comprises steps of bonding and setting (in particular the angle of the mirror), which are necessary but result in high costs. In addition, keeping to tolerances with repeatability is a key factor in the ability to manufacture such complex pieces in order to ensure that manufacture is successful.

However, it has been observed that when such an optical device is utilized, problems are faced associated with driving the support of the reflective surface in rotation. In fact, during assembly of this optical device, due to the tolerances and manufacturing inaccuracies and also despite a measured application of adhesive, troubles are produced, in particular causing the piece thus formed to be out of balance, resulting in imbalance when the device is driven in rotation.

In order to allow a correct weight distribution about the axis of rotation and thus to avoid imbalance when the optical device is driven in rotation, it is possible to correct the optical device by arranging complementary orifices in the sleeve. However, it is still necessary to rework each support in order to be able to rebalance it, which requires time and extends the manufacturing times for a lighting device comprising such an optical device. Reworking the piece is not the type of operation that is repeatable, which makes manufacture complex. In addition, some supports cannot be rebalanced, even by reworking the piece, which produces wastage of pieces and as a result loss of time and increased costs.

SUMMARY

In order to overcome these drawbacks, according to a first aspect of the invention; the aim of the invention is to propose an optical device comprising a reflective optical component, the mounting of which no longer requires adhesive and once assembled, allows it to be balanced, no longer requiring any reworking for the purpose of rebalancing it.

According to a second aspect of the invention, the invention relates to a module comprising an optical device, and in particular the optical device according to the invention, intended to be fitted easily in a lighting device in order to produce lighting effects.

According to a third aspect, the invention relates to a lighting device for producing scenic lighting effects, comprising an optical device or an optical module according to the invention.

To this end, the invention relates to an optical device comprising a support mounted on a rotational drive motor and a reflective optical component, the support comprising at least one sleeve coaxial with the axis of rotational drive; the sleeve comprising two diametrically opposite and identical openings in so as to extend in the sleeve between these two openings, one end of the sleeve defining an inlet orifice and comprising in its wall an opening defining an outlet orifice, so that a light beam entering via the inlet orifice is reflected by the reflective optical component so as to exit via the outlet orifice; the sleeve characterized in that the reflective optical component is mounted and held in the sleeve by cooperation of shape with the wall of said sleeve.

Thus advantageously, fastening the reflective optical component is performed in a purely mechanical manner without the need for adhesive, this cooperation of shape or positive engagement between the optical component and the support sleeve ensuring accurate fitting that is reliable over time.

According to an embodiment, the support comprises a disk from a face of which the sleeve projects upwards, in a single piece with the disk, the sleeve being constituted by a circular wall projecting on the face of the disk, defining the sleeve that has a circular cross section.

According to a variant embodiment, the support comprises a disk from a face of which the sleeve projects upwards, the sleeve being fastened on the disk by fastening means complementary to fastening means provided on the disk.

Thus, preferably, the support disk can have a diameter greater than the outer diameter of the sleeve.

In another embodiment, it can also be envisaged for the disk of the support to have a diameter equal to the outer diameter of the sleeve, the support then being constituted by the sleeve closed at one end by the disk.

The disk makes it possible in particular for the support to be fastened on the rotational drive motor. The motor is thus fastened on a face of the disk and the sleeve is arranged projecting on the other face. The inlet orifice is the projecting end of the sleeve. As a variant, provision can be made for the disk to have an orifice facing the sleeve forming the inlet orifice, and in this case, the motor has a passage for the light beam.

According to a first embodiment of an optical device according to the invention, the sleeve comprises at least one opening, arranged in its wall, in which the reflective optical component is housed and held engaged in the sleeve, the device also comprising a member holding the reflective optical component in the support, extending along the sleeve to cover at least the opening in which the reflective optical component is housed, the holding member and the support respectively comprising complementary fastening means.

Thus very advantageously, mounting the reflective optical component is carried out only by fitting said component by positive engagement in the opening arranged in the sleeve, where it is retained simply by fitting the holding member, which is itself fastened on the support, providing locking of the fitment of the reflective optical component purely by mechanical means.

Advantageously, the opening or openings have shape and dimensions that are complementary to those of the reflective optical component, so as to make it possible both to insert it into the sleeve through an opening and to hold it accurately in position in the sleeve due to the complementary dimensions of the opening and of the reflective optical component, blocking any movement of the component in a direction other than the direction of insertion. Thus advantageously an accurate positioning of the reflective optical component in the sleeve is obtained mechanically. The reflective optical component is advantageously housed and held in the sleeve of the optical device in an accurate and reliable manner in order to reflect the light beam entering via the inlet orifice of the device and to return this light beam via the outlet orifice of the optical device, the holding member locking this fitting.

The optical device according to the invention thus proposes simplified means for fitting a reflective optical component, no longer requiring bonding of said component such as a reflective surface like a mirror in the sleeve, for example on a specific support added in the sleeve to accommodate this reflective surface, which would result in disturbances in the balance of the device and a need to rework the support, for example by removal of material.

Advantageously, mounting the reflective optical component by insertion and retention thereof in the support opening or openings by cooperation of shape allows accurate assembly and positioning of this reflective optical component, the holding member locking this assembly.

The reflective optical component is chosen from the reflective optical components such as a reflective surface like a mirror which can be planar, concave or convex. This reflective optical component can also be constituted by reflective diffraction gratings, which are networks of elements such as stripes, reflective lines, making it possible to separate a beam into multiple beams, or even a reflective diffuser. By reflective optical component is also meant partially reflective optical components of the polarizing plate type.

Preferably, the sleeve comprises in its wall, two diametrically opposite and identical openings in which the reflective optical component is housed so as to extend in the sleeve between these two openings, the holding member then being arranged to cover the two openings and preventing withdrawal of the reflective optical component held in the openings.

Advantageously, when the reflective optical component is a reflective surface such as a planar mirror, the openings are two slots arranged to be identical and diametrically opposite one another in the sleeve, the outlet opening of the light beam reflected by said mirror being arranged to correspond between the slots. The shape of the slots is suitable for allowing the planar mirror to be inserted in the sleeve, this reflective optical component extending in the sleeve between the two slots where it is held by cooperation of shape and dimensions, the thickness of the component being complementary to the width of the slots.

Preferably, the holding member is constituted by a holding sleeve capable of being inserted over the support sleeve in order to extend against said sleeve and cover the two openings of the support sleeve accommodating the reflective optical component. The holding sleeve also comprises an orifice arranged in its circular wall in order to be placed to correspond with the outlet opening of the support sleeve, thus allowing the reflective optical component to be retained in the support, while allowing a light beam to enter the optical device and leave it again, reflected by the reflective optical component.

Preferably, the fastening means of the holding member and of the support are constituted by screwing means, allowing secure fitting both from the point of view of the positioning of the holding member with respect to the support sleeve and of the locking itself.

As a variant, provision can be made for the complementary fastening means to be constituted by clipping means such as clip fasteners, or even a fastening system of the bayonet type.

The optical device also comprises a motor on which the support is mounted using fastening means such as screws engaged in fastening orifices arranged in the support disk, so as to be capable of being driven in rotation. This motor is arranged on the face of the disk, opposite that on which the sleeve is present and therefore opposite the open end of the sleeve forming the inlet of the optical device. Advantageously, the motor can thus have a simple structure that does not need a passage for the light beam.

However, as a variant, provision can be made for the motor to have a passage for the light beam while the disk has an orifice forming the inlet orifice in the sleeve towards the reflective optical component.

According to a preferred embodiment of the invention, the holding member has at one end of its sleeve a flange intended to rest against the disk extending around the support sleeve, once the holding member is fitted. To this end, the disk preferably has a notch in which the flange of said holding member is housed. Thus an optical device is obtained which, mounted on a motor, can be driven in rotation at high speed without generating excessive noise and therefore having little acoustic disturbance. In fact, the optical device is thus enabled to have a continuous surface without any sharp edge, which makes it possible to avoid aerodynamic disturbance during the rotation of the device, which could generate excessive and unwanted noise.

The optical device according to the invention thus comprises a support which makes it possible to accommodate the reflective optical component such as a reflective surface like a planar mirror, through openings such as slots arranged in the sleeve with an orientation according to a chosen angle, sufficiently accurate not to need subsequent adjustment, a holding member that makes it possible to "enclose" and retain the reflective optical component in the support sleeve without the need to resort to adhesive, and the motor making it possible to drive the support in rotation.

Preferably, the inclination of the slots makes it possible to define accurately the inclination of the reflective surface. Thus, if the reflective surface has an inclination of 45°, during rotation of the device, the light beam at the outlet creates a planar light surface and if the angle of inclination of the reflective surface is different from 45°, the light beam at the outlet creates a light surface in the form of a cone.

According to an advantageous embodiment, the optical device is also produced to be balanced when it is driven in rotation, the parts constituting this device having removals of material allowing this balancing.

Preferably, the support sleeve thus has an orifice facing the outlet orifice of the light beam.

The different orifices or removals of material to be provided are determined for balancing the device according to the material of which the device is constituted.

The dimensions of the inlet and outlet orifices of the light beam are dimensioned according to the size of the source beam produced.

Advantageously, the holding member also has removals of material if necessary, for balancing the optical device thus constituted. These removals of material can be produced by recesses arranged in the wall of the sleeve constituting said holding member.

As a variant of this embodiment, the sleeve comprises at least one opening, arranged in its wall, in which the reflective optical component is housed and held engaged in the sleeve by force-fitting, without fitting any holding member. Preferably, the sleeve comprises two identical diametrically opposite openings in which the reflective optical component is housed by force-fitting so as to extend in the sleeve between these two openings. Advantageously, when the reflective optical component is a reflective surface such as a planar mirror, the openings are two slots arranged to be identical and diametrically opposite one another in the sleeve, the outlet opening of the light beam reflected by said mirror being arranged to correspond between the slots, in which the optical component is force-fitted.

According to a second embodiment of an optical device according to the invention, the reflective optical component is mounted and held in the sleeve, overmoulded in the wall of the sleeve.

Thus, advantageously, a cooperation of shape is obtained by the overmoulding of the reflective optical component which extends in the sleeve. The reflective optical component, which is as mentioned above, is thus held and therefore fastened even more accurately and reliably.

Due to the absence of adhesive for carrying out the assembly, the set of pieces constituting the optical support can easily be dimensioned so that the optical device is balanced, without the need to rework the piece, and in a repeatable manner. These pieces can advantageously be produced by moulding plastic material such as polybutylene terephthalate (PBT), in particular the material known under the reference PBT GF 30, corresponding to polybutylene terephthalate reinforced with 30% glass fibre. The manufacturing thereof is thus simplified and repeatable, making it possible to obtain a self-balancing optical device that does not need further subsequent adjustments.

The device according to the invention thus allows a shorter manufacturing cycle that does not require a step of reworking, which advantageously also allows the costs to be reduced.

Preferably, the optical device according to the invention comprises at its inlet orifice of the light beam, a closure element allowing the light beam to pass at least partially towards the reflective optical component.

Advantageously, this prevents any air flow entering via this open end of the optical device, which then when exiting via the outlet orifice arranged for the reflected light beam could generate excessive draught and noise during rotational drive.

This closure element which allows at least a part of the light beam, preferably the whole of the light beam, to pass, is preferably in the form of a disk, for example made from a transparent or translucent material, held in place during the fitting of the holding member on the support sleeve, the end of the holding sleeve of the holding member having a projecting radial rim forming a means of retaining the disk against the end of the support sleeve, or alternatively this closure element can also be overmoulded in the holding sleeve or even overmoulded in the support sleeve of the optical device.

As a variant, it is possible to envisage that such a closure element is a transmission optical component, allowing the light beam emitted by a source to pass, but capable of creating optical effects, such as lenses making it possible to have the beam, and as a result the thickness of the light plane at outlet, diverge or converge. Such an optical component can also be a diffuser to break the coherence of the laser beam and thus obtain a much more diffuse beam, or even diffraction gratings, which are networks of elements such as stripes, reflective lines, making it possible to separate a beam into multiple beams.

The optical device can also comprise at its orifice for the outlet of the light beam after reflection on the reflective optical component, a closure element of this outlet orifice, allowing at least a part of the reflected light beam to pass, for example made from a transparent or translucid material. This closure element makes it possible to close the outlet orifice of the light beam, which allows the noise generated during the rotation of the optical device to be further reduced. This closure element can thus also be held by the holding member, as described above, or overmoulded therein or even overmoulded in the support sleeve of the optical device. As a variant, it is possible to envisage that such a closure element is a transmission optical component, allowing the reflected light beam to pass, but capable of creating optical effects, such as lenses making it possible to have the beam, and as a result the thickness of the light plane at outlet, diverge or converge. Such a transmission optical component can also be a diffuser to break the coherence of the laser beam and thus obtain a much more diffuse beam, or even diffraction gratings which are networks of elements such as stripes, reflective lines, making it possible to separate a beam into multiple beams.

Thus, when the optical device comprises closure elements of these inlet and outlet orifices of the light beam, its aerodynamics is significantly improved, which advantageously allows noise to be reduced and therefore offers a beneficial acoustic gain.

Moreover, the assembly or a part of the pieces can be produced by moulding plastic material such as polybutylene terephthalate (PBT), the closure elements being capable of being integrated in the holding member or the support sleeve by overmoulding, which further simplifies the manufacture.

In particular, the optical device can thus be constituted by a disk on which a sleeve is added in which a reflective optical component is mounted by overmoulding, and which has a closure element at its end constituting the inlet orifice of the optical device, and another closure element at the level of the opening arranged in its wall facing the reflective optical component constituting the outlet orifice of the optical device, these closure elements being mounted in the sleeve by overmoulding. This sleeve also comprises fastening means complementary to fastening means provided on the disk, such as screwing or clip-fastening means.

The optical device as described above can be fitted in a lighting device so that when driven in rotation it converts a light beam emitted by a source provided in the lighting device into a light surface, so that after entering the optical device via the axis of rotation thereof and reflection by the reflective optical component, each light beam propagates in its cone of light in a direction that preferably depends on an angular position of the reflective optical component about its axis of rotation.

In addition, such an optical device has the advantage of being easily maintained during its use. In fact, as the assembly of this optical device is purely mechanical, it can easily be dismantled and reassembled, which makes it possible to easily ensure its maintenance and/or the replacement of its constituent pieces in case of need, as its different constituent elements can easily be dismantled to be repaired or exchanged in case of need. Moreover, an optical device according to the invention is sufficiently robustly produced to allow a large-diameter planar mirror to be used as reflective optical component in order to sweep a larger beam, for example a diameter of 24 mm, or even more.

According to a second aspect, a further aim of the invention is a module comprising an optical device of the type comprising a support with a reflective optical component and a motor for driving the support in rotation, characterized in that it comprises a protective hood equipped with a bottom, the optical device being fastened by its motor on the bottom of the hood, with the inlet and outlet orifices of a light beam of the device projecting from said protective hood, the module also comprising motor control means fastened within.

Thus, the invention also proposes a module constituted by a protective hood in which the optical device and the control means of said optical device are fastened, which makes it possible to mount them easily in a lighting device in the form of a unitary assembly, ready for use.

Preferably, the control means are arranged to control and operate the motor and by this means the rotational drive of the optical device comprising the reflective optical component about its axis at a speed of rotation that is constant or not.

These control means are in particular arranged to control a rotation of the reflective optical component about its axis at a speed of rotation greater than a threshold speed, so that each associated light source only emits its light beam when the reflective optical component has reached a speed of rotation greater than this threshold speed.

Preferably, the optical device in the optical module is an optical device as described above.

Preferably, the control means comprise an electronic card or printed circuit board (PCB), generally constituted by a support, generally a board, making it possible to hold and electrically connect together a set of electronic components, for the purpose of producing a complex electronic circuit, in the present case the control means of the motor.

Preferably, this card has a shape complementary to the hood and is fastened on a rim surrounding the bottom of the hood, in a manner distanced from the bottom of the hood. The protective hood thus comprises control means of the motor, comprising an electronic card having a central orifice engaged around the motor of the optical device and fastened in the protective hood so that one face is facing the bottom of the protective hood, distanced therefrom, the two faces of the card being capable of bearing components for control of the motor and control and/or supply cables. The optical device projects on the face of the card opposite the protective hood, so that a gap is provided between said face of the card and the support disk of the optical device.

Preferably, the control means comprise means for real-time measurement of the speed of rotation and of the angular position of the optical device.

These means comprise a first infra-red emitter and first infra-red receiver borne by the card so as to emit an infra-red radiation in the direction of a support surface, such as a face of the support disk. To this end, the face of the support disk, preferably the one not comprising the sleeve, comprises a single reflective zone, in the form of a segment belonging to a circular track, this reflective zone having a very short length making it possible to determine the angular reference position of the optical device (sort of origin) and the speed of the device and thus of the motor, once per revolution by reflection of an infra-red radiation.

So as to increase the accuracy of this measurement, a second infra-red emitter and a second infra-red receiver are provided, borne by the card so as to emit an infra-red radiation in the direction of a support surface, such as a face of the support disk. The face of the disk presents alternate reflective zones and non-reflective zones in order to form a second circular track, concentric with the first, making it possible to measure the rotation speed of the support with greater accuracy by reflection of an infra-red radiation.

Thus, a track is produced on a face of the support disk, comprising alternate reflective zones (called gloss zones) produced in the form of etched slots, and non-reflective zones (called matt zones), thus making it possible to return the IR beam towards the IR receiver allowing the measurement of the speed of rotation of the disk, of the reflective optical component and therefore of the motor. The face of the disk equipped with the two tracks is preferably that facing the card and therefore the infra-red radiation of the IR emitter-receivers borne by this card.

Advantageously, in item of information on the speed of rotation is thus obtained that is much more accurate than in the existing optical devices. It is then possible to control the light sources of a lighting device in relation to this speed with greater accuracy, which confers perfect stability of the lighting effects at the outlet of the system.

These means for measuring the speed of rotation and the angular position thus pick up an IR light flux on one of the tracks once per revolution, which makes it possible to have a point of origin in the sheet of light, and on the other track a light flux as many times as there are reflective zones.

The measurements carried out are processed by the control means in order to manage, in particular, the speed of rotation of the optical device.

The module according to the invention makes it possible to drive a reflective optical component in rotation with such accuracy that the beam does not tremble.

The optical device thus also projects from the open protective hood. This protective hood enclosing the electronic card and the optical device constitutes a module capable in particular of being fitted in a lighting device such as the one described in patent FR-B-3006454.

A lighting device of this type comprises an enclosed space at least partially delimited by transparent walls, in which a reflective system is arranged to receive each light beam originating from the optical device, propagating in a conical or planar light surface. Such a reflective system is arranged to move between several positions so that a change in the position of the reflective system modifies the path of a light beam reflected by the reflective system.

A lighting device can also comprise an injector arranged to inject into the enclosed space elements in suspension arranged to diffuse the light of each light beam. The elements in suspension comprise for example smoke, droplets (for example water droplets) or an aerosol.

The control means provided in the module are also arranged to be linked to the operating means of the lighting device such as a printed circuit that makes it possible to connect together: the light sources, the injector, the rotational drive motor of the optical device, the infra-red emitters/receivers of the means for measuring the rotation and the angular position of the optical device, the system or systems of reflectors.

According to an embodiment of the invention, the protective hood comprises means of fastening said module in the lighting device, fastened at one end in the protective hood and at their opposite end on an element of the lighting device and keeping a gap between said protective hood and said element; in which gap the optical device projects, these fastening means being such that legs made from a transparent material, a lateral wall made from a transparent material form a transparent ring.

According to a particularly advantageous embodiment of the invention, the module also comprises a fastening base part, linked to the protective hood comprising the optical device. This is a module capable of being easily fitted within a lighting device, simply by putting said module in place, the latter incorporating all the elements necessary for implementation of the desired visual effects.

In addition, it is easy to carry out tasks on a module in case of need, as it can easily be dismantled and reassembled, and the different constituent elements can easily be dismantled to be repaired or exchanged in case of need.

Advantageously, the base part of the fastening module comprises a central well allowing the passage of the light beam towards the optical device located positioned above the fastening base part, connecting means being provided, extending between the protective hood and the fastening base part, and keeping a gap between said protective hood and the fastening base, in which gap the optical device projects.

These connecting means are preferably constituted by legs fixed at one end in the protective hood and at their opposite end in the fastening base part. In place of these legs, it can be envisaged to fit as connection means between the base part of the module and the upper optical part of the optical module, a lateral wall made from a transparent material forming a transparent ring extending between the optical part of the module and the base part of this module. It can also be envisaged for the legs to be produced from a transparent plastic material.

According to a third aspect of the invention, the invention also relates to a lighting device for producing lighting effects comprising at least one source arranged to emit a light beam, an optical device arranged to send each light beam from a central zone in several possible directions contained within a cone of light the apex of which is situated in the central zone, so that each light beam propagates in its cone of light, and a reflective system arranged to receive each light beam propagating in its cone of light and to reflect in a space each light beam received, said reflective system being arranged to move between several positions so that a change of position modifies the path of a light beam reflected by the reflective system, in which the optical device is an optical device according to the invention or which comprises a module according to the invention.

BRIEF DESCRIPTION OF THE DRAWINGS

Other advantages and features of the invention will become apparent on reading the detailed description of embodiments that are in no way limitative, and from the following attached drawings in which the figures represent.

DETAILED DESCRIPTION

Firstly, with reference to the figures, an optical device D according to an embodiment of the invention will be described, intended to be used in a lighting device 1 for producing lighting effects. This lighting device 1 is given by way of example and shown in FIG. 10.

Figure 10:
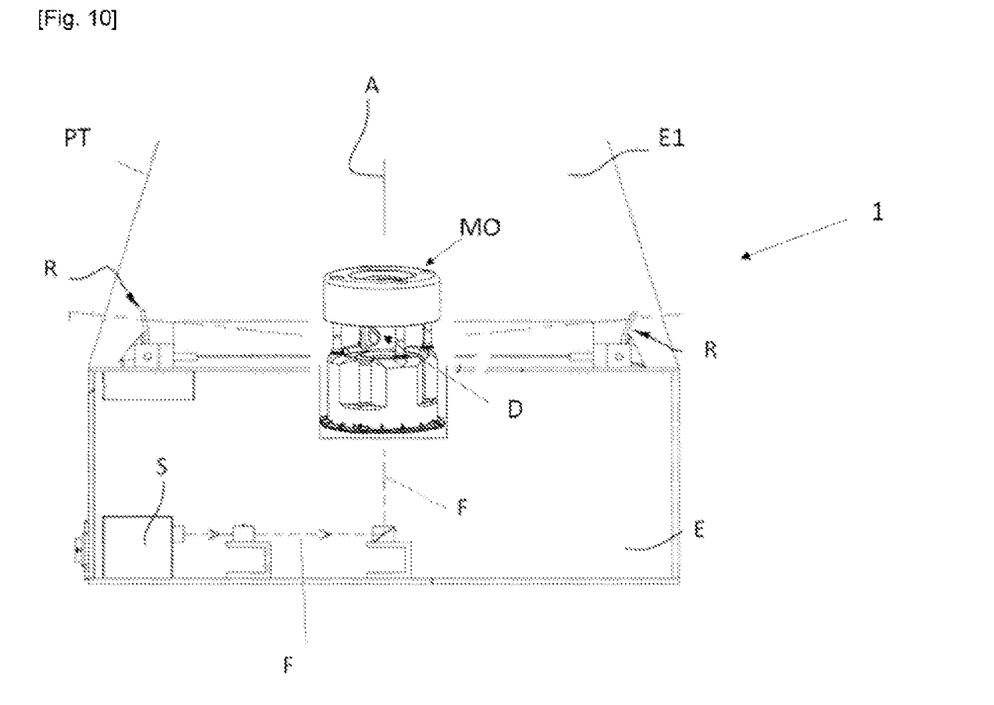
FIG. 10 a cross-section view of a lighting device comprising an optical module according to the invention.

The lighting device 1 comprises, in a space E, at least one source S arranged to emit a light beam F specific to this source S. The source S comprises a laser or an electroluminescent diode. The device 1 can also comprise opto-mechanical means (for example dichroic cubes) for superimposing and routing the optical paths of the light beams F emitted by the sources, to an optical device D.

The optical device D is arranged to send each light beam F from a central zone and more specifically, from a reflective optical component 4 (situated in this central zone) reflecting at 90° in several possible directions contained within a plane called "light plane" specific to this beam, so that each light beam propagates within its light plane towards a reflective system R.

The optical device D according to the invention thus comprises a reflective optical component 4. This reflective optical component 4 is constituted, in the example shown, by a mirror rotatably mounted in the central zone about an axis A (preferably perpendicular to the light plane of each light beam F), this rotation being actuated by a motor 5. This mirror 4 is arranged to reflect each light beam F so that after reflection by the mirror 4, each light beam F is propagated in its light plane in a direction that depends on the angular position of the mirror 4 about the axis of rotation A.

The optical device D is arranged so that this direction of a light beam explores all the orientations at 360 degrees around the central zone (i.e. around the reflecting surface 4 or about the axis A) when the mirror 4 completes one revolution about its axis A and this light beam F is emitted by its source S throughout this complete rotation.

Figure 6:
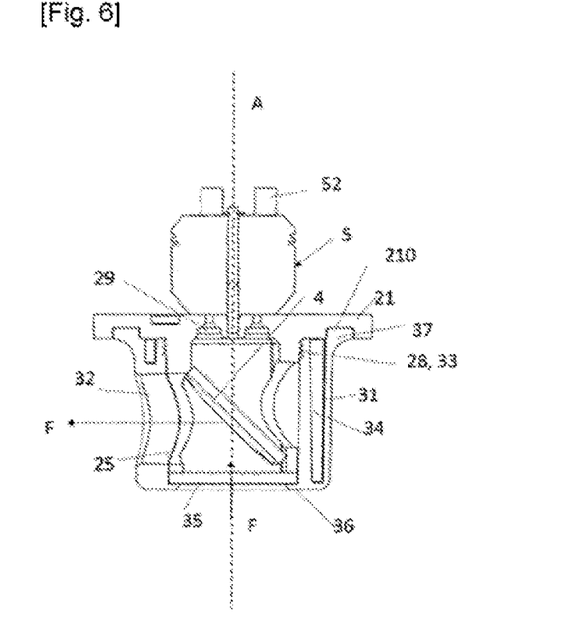
FIG. 6 a cross section view of the device in FIG. 5.

The optical device D according to the invention comprises a support 2 comprising the reflective optical component 4 and the motor 5 as can be seen in FIG. 6.

Figure 1:
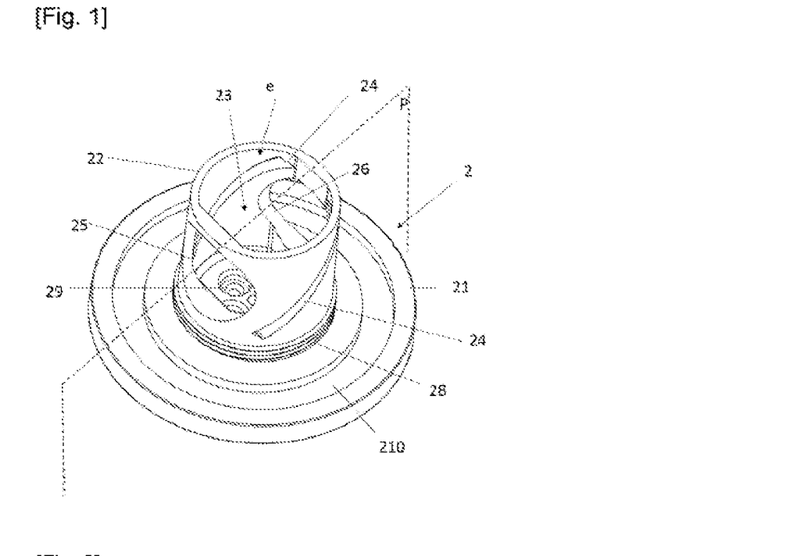
FIG. 1 a perspective top view of a first element of an optical device according to an embodiment of the invention.
Figure 2:
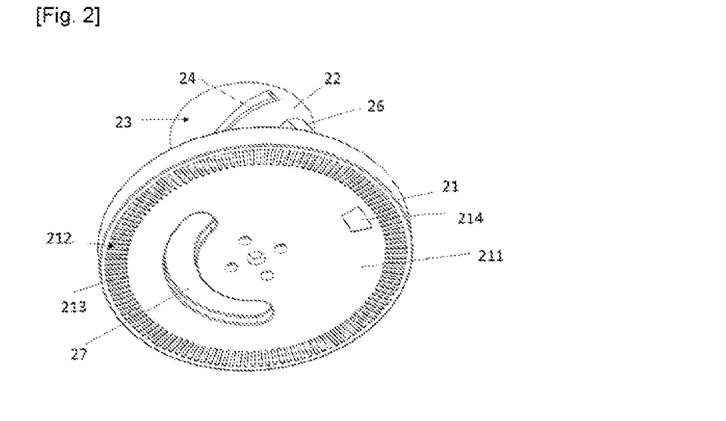
FIG. 2 a perspective bottom view of the element according to FIG. 1.

The support 2 comprises a disk 21 and a sleeve 23. The disk 21 is equipped on one face with a circular wall 22 projecting upwards from said face and defining the sleeve 23 coaxial with the central axis of the disk 21. In this example, the diameter of the disk 21 is greater than the outer diameter of the sleeve 23. The sleeve 23 thus has one open end defining the inlet e of the optical device and one end closed by the disk 21.

At the level of the circular wall 22 of the sleeve, arranged to be identical and diametrically opposite one another, are two openings such as two slots 24. These slots 24 constitute housing means by cooperation of shape for the reflective optical component 4, here a planar mirror. The mirror 4 is thus mounted in the support 2 via the slots 24. The shape and the dimensions of the slots 24 are such that the length of the slots 24 allows the insertion of the planar mirror 4 and their width corresponds to the thickness of said mirror 4, the mirror 4 extending through the sleeve 23 and held immobilized in the slots 24.

These slots 24 are arranged to be identical and symmetrical orthogonally with respect to a longitudinal median plane P passing through the sleeve 23. They are inclined so that the mirror 4 housed between the slots 24 extends in the sleeve 23 so as to have an inclination at 45° with respect to the disk 21 of the support 2.

Thus, a light beam F entering by the open end of the sleeve 23 is reflected at 90° by the mirror 4, inclined at 45° (cf. FIG. 6), to exit by an orifice forming an outlet opening 25 arranged in the wall 22 of the sleeve 23.

Figure 3:
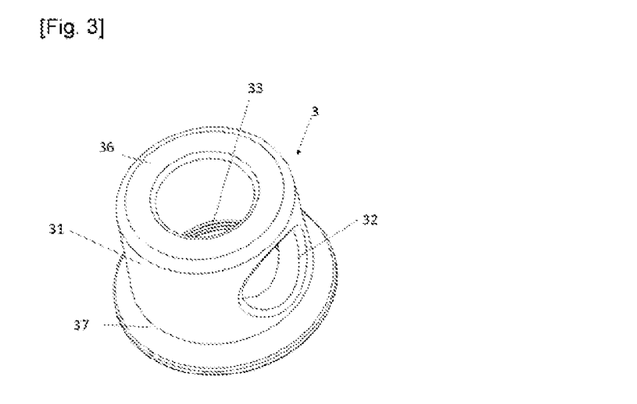
FIG. 3 a perspective top view of a second element of the optical device according to an embodiment of the invention.
Figure 4:
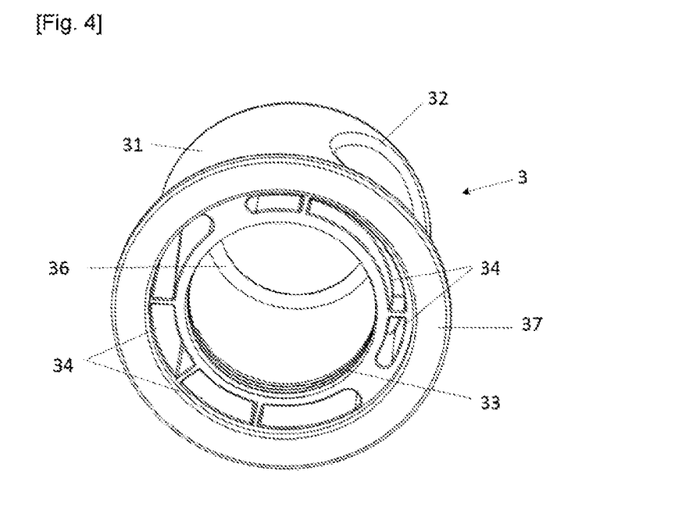
FIG. 4 a perspective bottom view of the element according to FIG. 3.
Figure 5:
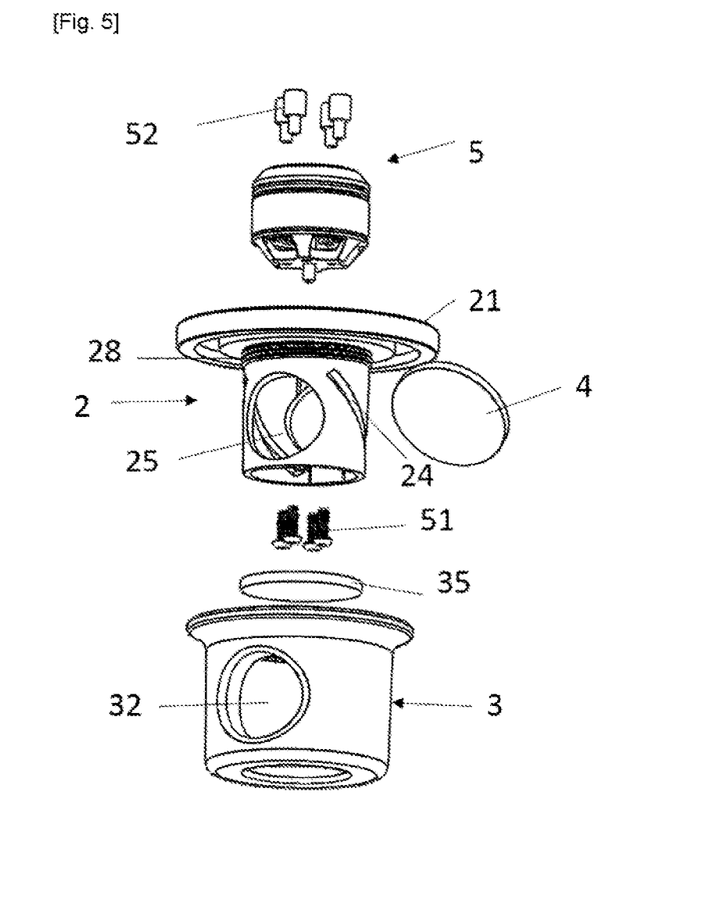
FIG. 5 an exploded lateral perspective bottom view of an optical device according to the invention.

So as to hold the reflective optical component 4 in the support 2, the latter comprises a holding member 3, constituted in the example shown by a holding sleeve 31, the inner diameter of which corresponds to the outer diameter of the sleeve 23 of the support 2. The holding member 3 also comprises fastening means complementary to fastening means arranged on the support 2.

Thus, the holding sleeve 31 of the holding cover 3 can be engaged on the sleeve 23 and once fitted and fastened on the sleeve 23, it immobilizes the mirror 4 in translation which, housed in the slots 24 of the sleeve 23, is thus immobilized and retained therein.

The holding member 3 also comprises an orifice 32 arranged in its circular wall and which is placed to correspond with the outlet opening 25 of the light beam reflected by the mirror 4, when it is fastened on the support 2.

When such an optical device D is utilized, problems are faced associated with driving the support 2 of the reflective surface 4 in rotation. Indeed, it is desirable to avoid an imbalance when the device D is driven in rotation. In order to allow a correct weight distribution about the axis of rotation A and thus avoid an imbalance when the optical device D is driven in rotation, it is possible to arrange removals of material in order to ensure balance in the device when it is driven in rotation.

Thus, in order to balance the support 2, the sleeve 23 has a second orifice (opening) 26 arranged in the wall 22 substantially diametrically opposite to the outlet orifice 25. Then, depending on the density of the material used to manufacture the support 2, it is possible to arrange removals of material at different locations of said support 2, such as for example on the face 211 of the disk in the form of a removal of material 27, obtained during moulding of the piece for example or by machining the piece.

According to a preferred embodiment of the invention, as shown in FIG. 6, the fastening means provided on the support 2 and on the holding member 3 allow the holding member 3 to be screwed onto the support 2.

Thus, the sleeve 31 has a female thread 33 fashioned on its inner face at its end to be housed against the disk 21 and arranged to engage with a male thread 28 fashioned on the outer face of the sleeve 23, preferably at the base of the sleeve 23 on the disk 21.

The optical device D according to the invention is thus assembled without the need to use adhesive. To this end, it is possible to provide a support 2 and a holding member 3 having removals of material allowing the optical device D to be balanced when the latter is driven in rotation, the absence of addition of adhesive making it possible to provide for balancing the piece without the need to subsequently rework the latter as was the case for the optical devices assembled with adhesive.

In particular, the sleeve 31 of the holding member 3 can also have recesses 34 arranged in its wall as can be seen in FIG. 4, these hollow parts 34 arranged in the wall of the holding sleeve 31 making it possible when the latter is mounted on the sleeve 23 to constitute an optical device which when it is driven in rotation has no imbalance.

In addition, the holding member 3 has at its end of the sleeve 31 a radially projecting flange 37 intended to rest against the disk 21 around the sleeve 23 of the support 2, once the holding member 3 is fitted. Preferably, the disk 21 has a groove 210 at the base of the sleeve 23, in which the flange 37 of the member 3 can be housed. Advantageously, the optical device D thus obtained, when it is mounted on a motor, can be driven in rotation at high speed without generating excessive noise.

In fact, the optical device D is thus enabled to have a continuous surface without any sharp edge, which makes it possible to avoid aerodynamic disturbance during the rotation of the device D which could generate excessive and unwanted noise. Similarly, the fillet between the flange 37 and the sleeve 31 is thick, which confers rigidity on the assembly thus formed.

Advantageously, the inlet end of the optical device D is closed using a closure element, for example made from transparent material 35, allowing the light beam F emitted by a source S, such as a laser beam, to pass. In fact, this prevents any air flow entering via this open end of the device D and exiting via the outlet orifice 32/25 of the device arranged for the reflected light beam, which could generate excessive draught and noise. This closure element is in the form of a disk 35 held in place when the holding member 3 is fitted on the sleeve 23 of the support 2. To this end, the end of the sleeve 31 opposite the one provided with fastening means has a radially projecting edge 36 forming a means of retaining the disk 35 against the end of the sleeve 23.

Such a closure element 35 can advantageously be replaced by a transmission optical component, allowing the light beam emitted by a source to pass, but capable of creating various effects, such as for example lenses making it possible to have the beam, and as a result the thickness of the light plane at outlet, diverge or converge. Such an optical component could also be a diffuser to break the coherence of the laser beam and thus obtain a much more diffuse beam, or even diffraction gratings, which are networks of elements such as stripes, reflective lines, making it possible to separate a beam into multiple beams.

Similarly, it is possible to provide a closure element or transmission optical component as closure mounted on the outlet orifice of the optical device 25/32 of the light beam after reflection, in order to add potential effects, and/or to allow further reduction in the noise generated during the rotation of the optical device D. These closure elements can, for example, be overmoulded in the holding member 3.

The support 2 is mounted on the motor 5 using suitable fastening means such as screws 51 engaged through orifices 29 arranged in the disk 21.

Such an optical device D according to the invention is thus intended to be used in the lighting device 1 described above.

The reflective optical component or mirror 4 of the optical device D is thus rotatably mounted about an axis A (preferably perpendicular to the light plane of each light beam), this rotation being actuated by the motor 5.

This mirror 4 is arranged to reflect each light beam so that after reflection by the mirror 4, each light beam is propagated in its light plane in a direction that depends on an angular position of the mirror 4 about its axis A.

The optical device D is arranged so that this direction of a light beam explores all the orientations at 360 degrees around the central zone (i.e. around the mirror 4 or about the axis A) when the mirror 4 completes one revolution about its axis A and this light beam is emitted by its source throughout this complete rotation.

According to a second aspect of the invention, an optical device D such as that described above or another is advantageously integrated in a module MO capable of being integrated in a lighting device 1.

To this end, the optical device D is mounted in a protective hood 12, which has a bottom 121 and a peripheral rim 122 extending perpendicularly to the bottom 121.

The optical device D is mounted in the hood 12, fastened by its motor 5 and shock-absorber elements 52 coming into abutment with the bottom 121 of the protective hood 12 in order to absorb the shocks, vibrations and noise while keeping the different elements together.

Figure 7:
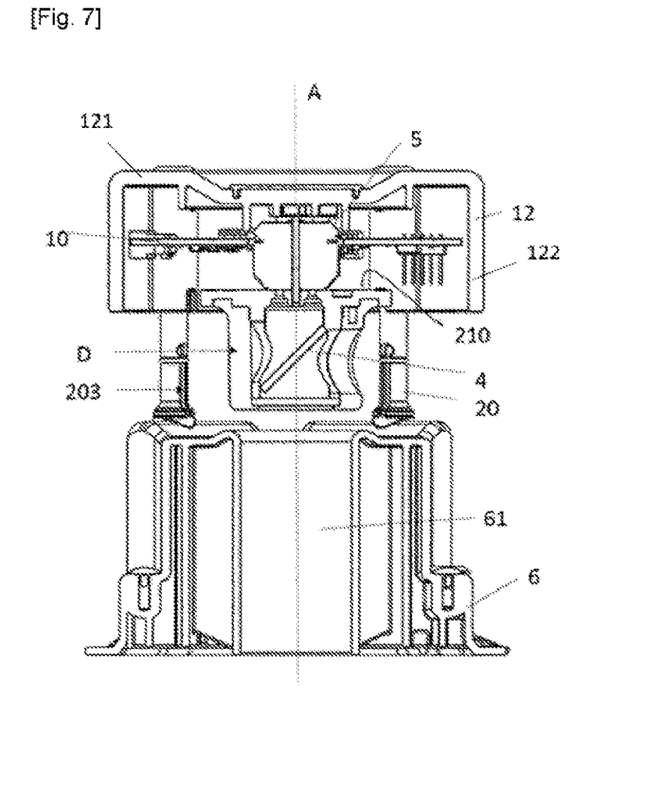
FIG. 7 a cross-section view of a module according to the invention.
Figure 8:
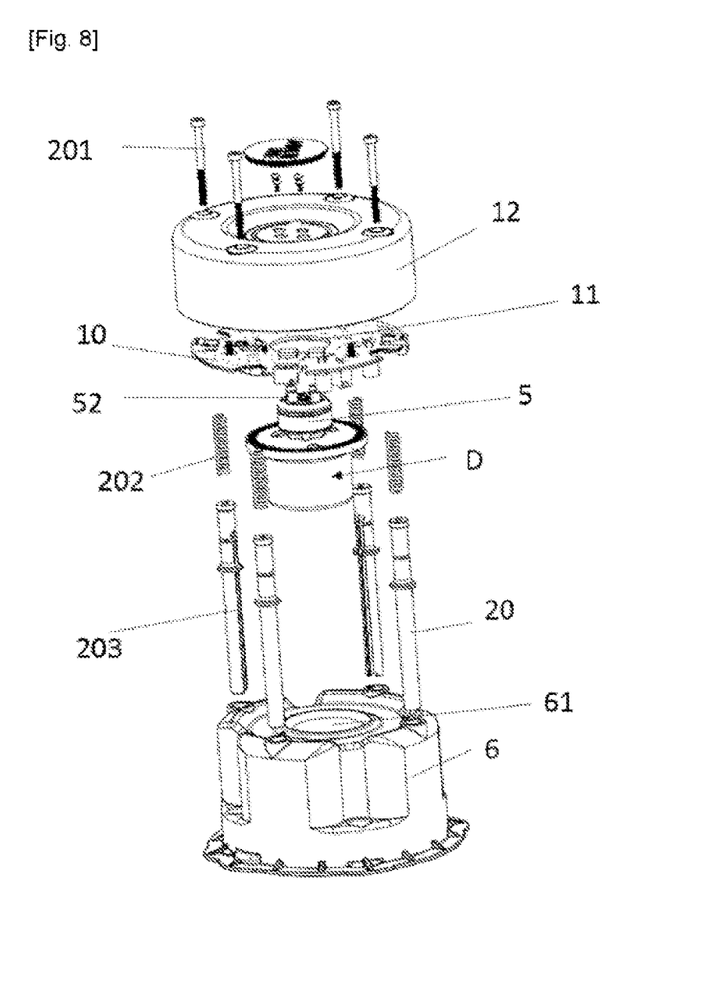
FIG. 8 an exploded perspective view of the module in FIG. 7.

The protective hood 12 also houses the control means of the motor constituted by an electronic card 10 having a cross section identical to the cross section of the protective hood 12 and fastened to the lateral rim 122. This card 10 has a central orifice 11 in which the motor 5 is housed, in such a way that a part of the motor 5 and the optical device D project on a face of said card 10 as can be seen in FIGS. 7 and 8.

This card 10 and the optical device D are housed in a protective hood 12 such that the light beam inlet and outlet orifices of the optical device project from the protective hood 12, in particular beyond the rim 122, in order to allow the propagation of the reflected light beam F.

This card 10 advantageously comprises the control means of the motor, housed in the space between the card 10 and the bottom 121 of the protective hood 12, or on the other face of the card 10, a gap also existing between this face of the card 10 and the disk 21 of the optical device D.

The control means are arranged to control a rotation of the mirror 4 about its axis A at a speed of rotation (or "sweep speed") that is constant or not (or at least comprised within a short value interval, typically at plus or minus 5% with respect to an average value in time), (typically equal to 20400 revolutions per minute), and greater than a threshold speed.

Figure 9:
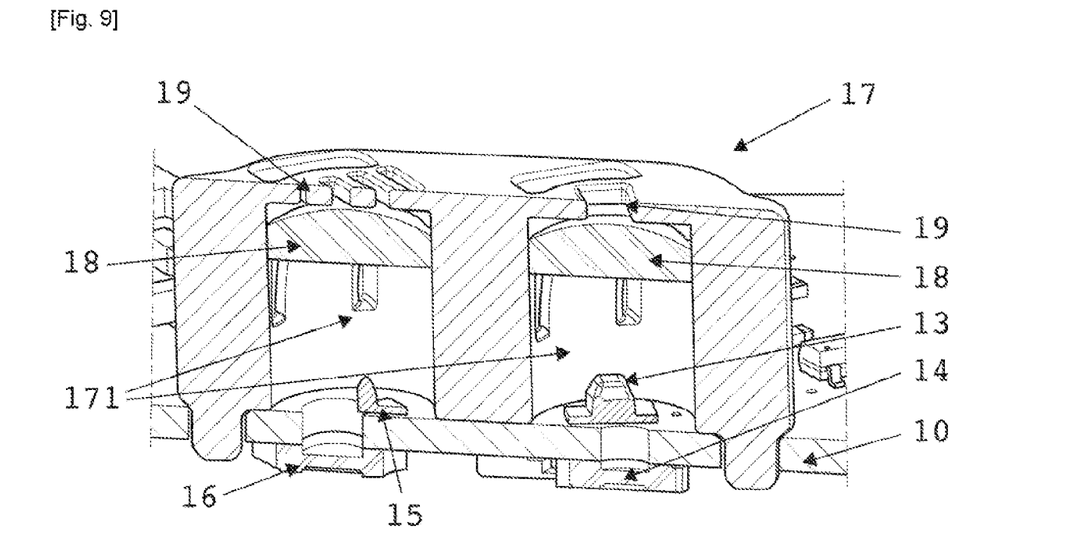
FIG. 9 a cross-section view of the safety systems of the module according to the invention.

Preferably, means for measuring the speed of rotation and the angular position of the mirror 4, constituting a safety system, using an infra-red emitter 13 and a receiver 14 linked to the control means in order to know the real-time speed of rotation of the optical device D. Thus, if the speed should become too low (below the threshold speed), the sources S are automatically turned off, thus improving the safety of the lighting device 1. Moreover, by prioritizing a constant speed, passing through speed "dead spots" is avoided, and safety is improved.

The first infra-red emitter 13/receiver 14 is arranged to allow the speed of rotation and the angular position to be known. Advantageously, second means of measuring the speed of rotation are provided, constituted by second infra-red emitter 15 and infra-red receiver 16 that make it possible to increase the accuracy of measurement of the speed, which allows stable effects to be obtained, because it is thus possible to determine when to switch the light beams on and off within the revolution in order to create fixed light beams.

Thus, the first infrared emitter 13/receiver 14 emits an infra-red radiation in the direction of the face 211 of the disk 21 that comprises opposite it, a single reflective zone in the form of a segment 214 belonging to a first circular track; this reflective zone 214, having a very short length, makes it possible to determine the angular position of the optical device D and to measure the speed of rotation over one revolution.

The second infra-red emitter 15/receiver 16 is borne by the card 10 so as to emit an infra-red radiation (IR) in the direction of the face 211 of the disk 21 of the support 2, the latter comprising, facing the infra-red radiation, alternate zones reflecting said infra-red radiation and zones that do not reflect the infra-red radiation forming a circular track 212, concentric with the track 214, which makes it possible to measure the speed of rotation with greater accuracy. For example, it is possible to arrange striations 213 on said face 211 in order to form reflective surfaces, for example 256 striations per revolution.

This measurement system thus picks up an IR light flux on the track 214 once per revolution, which makes it possible to have a point of origin in the sheet of light and a speed per revolution, and on the other track 212 a light flux as many times as there are reflective surfaces 213.

An item of information on the speed of rotation is thus obtained that is much more accurate than with the existing optical devices. It is then possible to control the light sources S with greater accuracy with respect to this speed, conferring perfect stability of the lighting effects at the outlet of the system.

These measurement means are thus constituted by two IR emitters/receivers capable of being mounted on the card 10 by welding and a plastic piece 17 that is fixed on the card 10, for example using a clip. This piece 17 has two housings 171 in each of which is mounted a lens 18 and a slot mask 19; each housing 171 is also associated with an infra-red emitter/receiver 13, 14; 15, 16 and a track 212, 214 of the disk 21.

The items of information retrieved by the measurement means are processed by the control and operation system, which can thus manage the speed of the optical device D as well as the light sources S.

In fact, the modulation on the laser sources makes it possible to produce "bars" of light, the number of which varies as a function of the relationship between the frequency of the square signal sent to the modulation and the speed of rotation. It is possible to control the position of the "bars" created accurately, in the knowledge of the angular position in the plane at 360° around the central zone.

The protective hood 12 equipped with the optical device D forms a module MO and also comprises connecting means such as legs 20 allowing it to be fastened either directly on an element of the lighting device 1 such as a plate separating the space E from the space E1 above, or on a lower part of the module that constitutes a fastening base part 6 also constituting with the optical device a module MO.

The base part 6 of the optical module MO has a central well 61 aligned with the inlet of the sleeve 23 of the optical device D, thus allowing the passage of a light beam F towards the optical device D of the module MO as well as means allowing the connecting means 20 of the optical module to be fastened.

Advantageously, as this base part 6 is aligned with the optical device D, it acts as a centring element to position and fix the module MO in a lighting device as described above, centring such a module making it possible for the laser beam F to be centred without the need for an additional alignment step.

According to the example shown, the module MO comprises as connection means, four legs 20 extending between the protective hood 12 and the fastening base part 6 of the module MO.

These legs 20 generate leaks in the laser plane; thus with four legs 20 as in this example, there will be four holes in the light plane. This can be beneficial in a lighting device where the number of lateral reflectors is a multiple of 4. Of course, provision can be made for a different number of legs 20.

The fastening base part 6 of the module is fitted on a plate separating the space E in which the light sources S are located and the space E1 in which the optical device D is located, as can be seen in FIG. 10.

Preferably, the legs 20 are hollow and in their part extending at the level of the protective hood 12, screws 201 are put in place associated with springs 202 housed in abutment in the legs 20. These springs 202 make it possible to keep under tension the screws 201 accessible through the protective hood 12, which allows adjustment of the angular position of the protective hood 12 and therefore of the motor 5. This makes it possible in the assembled finished module to set and adjust the orientation of the light plane.

In the legs 20 part below the springs 202, at least one longitudinal slot 203 is provided to allow the passage of electrical supply wires arranged to supply the motor 5 and originating from the space E or to allow the passage of the connecting wires between the control means of the module MO and the means of operation of the lighting device.

The device 1 also comprises a reflective system R arranged to receive each light beam originating from the optical module MO and propagating in its light plane and to reflect in the enclosed space E1 (and outside its light plane) each light beam received (i.e. to send each light beam received to the interior of the enclosed space E1).

The control means of the lighting device according to the invention are also arranged to control at what moment each of the sources S emits its light beam, given that each of the sources S is arranged to emit its light beam both continuously and discontinuously. Different forms can be given to the lighting effects created by the device 1 according to the instants during which a given source S emits its light beam. It is possible to pass for example from a continuous figure to a wireframe figure formed from bars; it is also possible to choose the colour of the bars, their thickness and their movement: direction of rotation, speed, etc.

By virtue of the control means, it is thus possible to modify the light surfaces in real time and to create lighting choreography by moving the mirrors of the reflective system R using motors, by acting on the optical device D, on the modulation and power of the sources S as well as the smoke injector.

Of course, the invention is not limited to the examples that have just been described, and numerous modifications may be made to these examples without exceeding the scope of the invention.

The invention claimed is:

1. An optical device comprising: a support mounted on a rotational drive motor and a reflective optical component; the support comprising at least one sleeve coaxial with an axis of rotational drive; one end of the sleeve defining an inlet orifice and comprising in its wall an opening defining an outlet orifice in which the reflective optical component is housed, so that a light beam entering via the inlet orifice is reflected by the reflective optical component so as to exit via the outlet orifice; and the reflective optical component is mounted and held in the sleeve by cooperation of the shape of the wall of said sleeve, the sleeve comprising two diametrically opposite and identical openings in which the reflective optical component is housed so as to extend in the sleeve between these two openings.

2. The optical device according to claim 1, wherein the support comprises a disk from a face of which the sleeve projects upwards, in a single piece with the disk, the sleeve being constituted by a circular wall projecting on the face of the disk, defining the sleeve having a circular cross section.

3. The optical device according to claim 1, wherein the support comprises a disk from a face of which the sleeve projects upwards, the sleeve being fastened on the disk by fastening means complementary to fastening means provided on the disk.

4. The optical device according to claim 1, wherein the reflective optical component is a reflective diffractive grating which has a reflective surface with networks of elements such as stripes or reflective lines which make it possible to separate a beam into multiple beams.

5. The optical device according to claim 1, wherein the openings are two slots arranged to be identical and diametrically opposite one another in the sleeve.

6. The optical device according to claim 1, characterized in that the reflective optical component is mounted and held in the sleeve by force-fitting in the opening or openings.

7. The optical device according to claim 1, wherein the device comprises a holding member of the optical component in the support, extending along the sleeve to cover the opening or openings in which openings of the optical component is housed, the holding member and the support respectively comprising complementary fastening means.

8. The optical device according to claim 7, wherein the holding member is constituted by a holding sleeve capable of being engaged on the sleeve of the support to extend against said sleeve and cover the two openings of the sleeve and comprising an orifice arranged in its circular wall to be placed to correspond with the outlet opening of the support.

9. The optical device according to claim 7, wherein the complementary fastening means of the holding member and of the support are constituted by screwing means, clipping means such as clip fasteners, a fastening system of the bayonet type.

10. The optical device according to claim 1, characterized in that the reflective optical component is mounted and held in the sleeve, overmoulded in the wall of the sleeve.

11. The optical device according to claim 1, wherein the optical device comprises at its inlet orifice of the light beam, a closure element allowing the light beam to pass at least partially towards the reflective optical component.

12. The optical device according to claim 1, wherein the optical device comprises at its outlet orifice of the light beam, a closure element allowing the reflected light beam to pass at least partially.

13. The optical device according to claim 2, wherein a face of the disk comprises a single reflective zone configured as a short segment on a first circular track defined on the surface of the face of the disk as the disk is rotated.

14. The optical device according to claim 2, wherein the face of the disk comprises a second circular track of reflective zones alternating with non-reflective zones, concentric with the first circular track.

15. A module comprising an optical device of the type comprising a support with a reflective optical component and a motor for driving said support in rotation, according to claim 1, further comprising a protective hood equipped with a bottom surrounded by a peripheral rim; the optical device being fastened by its motor on the bottom of the hood; with the inlet and outlet orifices of a light beam of the device projecting from said protective hood.

16. The module according to claim 15, wherein the protective hood comprises control means of the motor, comprising an electronic card having a central orifice engaged around the motor of the optical device and fastened in the protective hood so that one face is facing the bottom of the protective hood, distanced therefrom, the two faces of the card being capable of bearing components for control of the motor and the operation and/or supply cables.

17. The module according to claim 16, wherein the control means comprise means for real-time measurement of the speed of rotation and of the angular position of the optical device, said measurement means comprising a first infra-red emitter/receiver emitting an infra-red radiation in the direction of a support surface which comprises a single facing reflective zone in the form of a segment belonging to a first circular track.

18. The module according to claim 17, wherein the control means comprise a second infra-red emitter/receiver so as to emit an infra-red radiation in the direction of a support surface having alternate zones reflecting the infra-red radiation and zones not reflecting the infra-red radiation in order to form a circular track concentric with the first circular track.

19. The module according to claim 15, wherein the protective hood comprises means of fastening said optical module in a lighting device, fastened at one end in the protective hood and at an opposite end to the lighting device; since the protective hood is resting on the means of fastening, a gap is defined between said protective hood and the lighting device, in which gap the optical device, which is located within the optical module, projects.

20. The module according to claim 15, wherein the module also comprises a fastening base part, linked to the part of the optical module comprising the optical device, by connecting means extending between the protective hood and the fastening base part and keeping a gap between said protective hood and the fastening base part, in which gap the optical device projects.

21. The module according to claim 20, wherein the fastening base part of the optical module comprises a central well allowing the passage of a light beam towards the optical device located positioned above the fastening base part.

22. A lighting device for producing lighting effects, comprising: at least one source arranged to emit a light beam; an optical device associated with the motor, arranged to send each light beam from a center of the optical device in several possible directions contained within a cone of light the apex of which is situated in the center of the optical device, so that each light beam propagates in its cone of light; and a reflective system arranged to receive each light beam propagating in its cone of light and to reflect in a space each light beam received; said reflective system being arranged to move between several positions so that a change of position modifies the path of a light beam reflected by the reflective system; and the optical device is a device according to claim 5.

23. A lighting device for producing lighting effects, comprising: at least one source arranged to emit a light beam; an optical device associated with the motor, arranged to send each light beam from the center of the optical device in several possible directions contained within a cone of light the apex of which is situated in the center of the optical device, so that each light beam propagates in its cone of light; and a reflective system arranged to receive each light beam propagating in its cone of light and to reflect in a space each light beam received; said reflective system being arranged to move between several positions so that a change of position modifies the path of a light beam reflected by the reflective system; and the optical device is an optical module according to claim 15.

24. The optical device according to claim 1, wherein the reflective optical component is a mirror taken from the group: a planar mirror, a concave mirror, a convex mirror.

25. The optical device according to claim 1, wherein the reflective optical component is one of a reflective diffuser and an optical component that is partially reflective, such as polarizing plates.

26. The module according to claim 19, wherein the fastening means are one of legs made from transparent material and a lateral wall made from transparent material forming a transparent ring.

27. The module according to claim 20, wherein the fastening means are one of legs made from transparent material and a lateral wall made from transparent material forming a transparent ring.

* * * * *